(12) United States Patent
Burr et al.

(10) Patent No.: US 12,019,590 B2
(45) Date of Patent: Jun. 25, 2024

(54) SYSTEM, METHOD AND ARTICLE OF MANUFACTURE FOR SYNCHRONIZATION-FREE TRANSMITTAL OF NEURON VALUES IN A HARDWARE ARTIFICIAL NEURAL NETWORKS

(71) Applicant: INTERNATIONAL BUSINESS MACHINES CORPORATION, Armonk, NY (US)

(72) Inventors: Geoffrey W. Burr, San Jose, CA (US); Pritish Narayanan, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 18/059,175

(22) Filed: Nov. 28, 2022

(65) Prior Publication Data

US 2023/0086636 A1    Mar. 23, 2023

Related U.S. Application Data

(62) Division of application No. 15/410,769, filed on Jan. 20, 2017, now Pat. No. 11,580,373.

(51) Int. Cl.
*G06F 17/00*     (2019.01)
*G06F 3/06*      (2006.01)
*G06F 16/174*    (2019.01)

(52) U.S. Cl.
CPC ........ *G06F 16/1748* (2019.01); *G06F 3/0608* (2013.01); *G06F 3/0641* (2013.01); *G06F 3/067* (2013.01); *G06F 3/0659* (2013.01)

(58) Field of Classification Search
CPC ........ G06F 16/13; G06F 16/24; G06F 16/156; G06F 3/0641; G06N 3/00; G06N 5/00;
(Continued)

(56) References Cited

U.S. PATENT DOCUMENTS 4,393,371 A * 7/1983 Morgan-Smith ...... H03M 1/127
                                                        360/32
5,350,953 A    9/1994 Swenson et al.
(Continued)

FOREIGN PATENT DOCUMENTS

CN     102959565 A    3/2013
EP       1164537 A2  12/2001
(Continued)

OTHER PUBLICATIONS

Chinese Office Action for CN Application No. 201780084089.6 dated Dec. 2, 2022.
(Continued)

*Primary Examiner* — Hung D Le
(74) *Attorney, Agent, or Firm* — Erik A. Huestis; Sameer K. Pai; Foley Hoag LLP

(57) ABSTRACT

Computations in Artificial neural networks (ANNs) are accomplished using simple processing units, called neurons, with data embodied by the connections between neurons, called synapses, and by the strength of these connections, the synaptic weights. Crossbar arrays may be used to represent one layer of the ANN with Non-Volatile Memory (NVM) elements at each crosspoint, where the conductance of the NVM elements may be used to encode the synaptic weights, and a highly parallel current summation on the array achieves a weighted sum operation that is representative of the values of the output neurons. A method is outlined to transfer such neuron values from the outputs of one array to the inputs of a second array with no need for global clock synchronization, irrespective of the distances between the arrays, and to use such values at the next array, and/or to convert such values into digital bits at the next array.

4 Claims, 4 Drawing Sheets

(58) Field of Classification Search
CPC ........ G06N 3/04; G06N 3/049; G06N 3/0635;
G05B 13/00; H03K 5/00; H03K 19/0013;
H03K 19/0175
See application file for complete search history.

(56) References Cited

U.S. PATENT DOCUMENTS

| | | | |
|---|---|---|---|
| 5,404,556 A | 4/1995 | Mahowald et al. | |
| 5,410,310 A | 4/1995 | Molnar | |
| 6,353,342 B1* | 3/2002 | Alvandpour | ........ H04L 25/0292 327/51 |
| 7,227,869 B2* | 6/2007 | Findlater | ............... H04J 3/0685 710/63 |
| 7,733,258 B2* | 6/2010 | Berens | .................. H03M 1/007 341/145 |
| 8,148,814 B2* | 4/2012 | Furuta | ...................... G11C 5/04 257/725 |
| 9,053,428 B2* | 6/2015 | Hunzinger | ............. G06N 3/049 |
| 9,257,975 B2* | 2/2016 | Byeon | ...................... H03K 5/08 |
| 9,680,460 B2* | 6/2017 | Jeong | ............... H03K 19/00323 |
| 9,871,530 B1* | 1/2018 | La Grou | ................ H03M 1/68 |
| 11,580,373 B2 | 2/2023 | Burr et al. | |
| 2002/0080883 A1* | 6/2002 | Tamura | ............... H04L 25/0278 375/257 |
| 2005/0122238 A1 | 6/2005 | Nomura et al. | |
| 2006/0074820 A1* | 4/2006 | Seger | ........................ G06N 3/02 706/11 |
| 2006/0202938 A1* | 9/2006 | Chen | .................... G09G 3/3685 345/100 |
| 2006/0271342 A1 | 11/2006 | Farhat et al. | |
| 2007/0103199 A1* | 5/2007 | Tzartzanis | .......... H04L 25/0282 326/82 |
| 2007/0229115 A1* | 10/2007 | Hwang | ................ H03K 5/1565 326/93 |
| 2008/0147340 A1* | 6/2008 | Gebara | ............ G01R 31/31725 702/69 |
| 2008/0152357 A1* | 6/2008 | Okayasu | ............... H04B 10/504 398/183 |
| 2009/0196312 A1* | 8/2009 | Kuroda | ................... H04J 3/047 370/503 |
| 2009/0313195 A1* | 12/2009 | McDaid | ................. G06N 3/049 706/26 |
| 2011/0004579 A1 | 1/2011 | Snider | |
| 2011/0037505 A1* | 2/2011 | Kawamoto | ............... H03L 7/07 327/159 |
| 2011/0291702 A1* | 12/2011 | Kaeriyama | ......... H04L 25/0266 326/62 |
| 2012/0011088 A1 | 1/2012 | Aparin et al. | |
| 2012/0084241 A1 | 4/2012 | Friedman et al. | |
| 2013/0024409 A1* | 1/2013 | Hunzinger | ............. G06N 3/049 706/25 |
| 2013/0151449 A1* | 6/2013 | Ponulak | ................. G06N 3/049 706/25 |
| 2013/0325776 A1* | 12/2013 | Ponulak | ................. G06N 20/00 700/250 |
| 2014/0082396 A1* | 3/2014 | Vahidsafa | ................. G06F 1/10 713/400 |
| 2014/0222739 A1* | 8/2014 | Ponulak | ................. G06N 3/049 706/25 |
| 2014/0266318 A1* | 9/2014 | Bae | ....................... H04L 7/0332 327/105 |
| 2016/0035321 A1* | 2/2016 | Cho | ..................... G09G 3/2092 345/213 |
| 2016/0149642 A1* | 5/2016 | Sun | .................. H04B 10/25891 398/116 |
| 2016/0267378 A1 | 9/2016 | Eleftheriou et al. | |
| 2017/0133418 A1* | 5/2017 | Hwang | ............ H03K 3/356121 |
| 2017/0237917 A1 | 8/2017 | Sato et al. | |

FOREIGN PATENT DOCUMENTS

| | | |
|---|---|---|
| JP | S 61-256838 A | 11/1986 |
| JP | 2005-122467 A | 5/2005 |
| JP | 2007228770 A | 9/2007 |
| JP | 2013-534017 A | 8/2013 |
| WO | 9323814 A1 | 11/1993 |
| WO | 2005038645 A2 | 4/2005 |
| WO | 2014/041858 A1 | 3/2014 |

OTHER PUBLICATIONS

Chinese Office Action for CN Application No. 201780084089.6 dated May 27, 2023.
Burr et al., "Experimental demnstration and tolerancing of a large-scale neural network (165,000 synapses), using phase-change memory as the synaptic weght element," 2014 IEEE International Electron Devices Meeting (IEDM), 6 pages, Dec. 15-Dec. 17, 2014.
Burr et al., "Large-scale neural networks implemented with non-volatile memory as the synaptic weight element: comparative performance analysis (accuracy, speed, and power)," 2015 IEEE International Electron Devices Meeting (IEDM), 4 pages, Dec. 7/Dec. 9, 2015.
EPO Examination Report for EP Application No. 17836024.4 dated Jul. 1, 2021.
Gambuzza et al., "Memristor-based adaptive coupling for consensus and synchronization," IEEE Tranactions on Circuits and Systems-I: Regular Papers, 62(4):1175-1184 (2015).
Hikaney et al., "Power Efficient Design of Counter on 0.12 Micron Technology," IJSCE, 1(1): 19-23 (2011).
Horak et al., "A low-overhead asynchronoud nterconnection network for GALS chip multiprocessors," 2010 Fourth ACM/IEEE International Symposium on Networks-on-Chip (NOCS), IEEE, 43-50 (2010).
Notice of Reasons for Refusal for JP Patent Application No. 2019-538221 dated Jun. 25, 2021.
Philipp et al., "Interconnecting VLSI spiking neural networks using isochronous connections," Lecture Notes in Computer Science, V4507, Springer Berlin Heidelberg, 471-478 (2007).
Reconsideration Report by Examiner before Appeal for JP Application No. 2019-538221 dated Sep. 14, 2022.
Response to EPO Examination Report for EP Application No. 17836024.4 dated Oct. 13, 2021.
Tanaka et al., "An analog CMOS circuit for spiking neuron models," International Cngress Series, 217-220 (2006).

* cited by examiner

SYSTEM, METHOD AND ARTICLE OF MANUFACTURE FOR SYNCHRONIZATION-FREE TRANSMITTAL OF NEURON VALUES IN A HARDWARE ARTIFICIAL NEURAL NETWORKS

CROSS-REFERENCE TO RELATED APPLICATIONS

This application is a divisional of U.S. application Ser. No. 15/410,769, filed Jan. 20, 2017 which is hereby incorporated by reference in its entirety.

BACKGROUND OF THE INVENTION

Field of Invention

The present invention relates generally to the field of artificial neural networks (ANNs). More specifically, the present invention is related to a system, method and article of manufacture for synchronization-free transmittal of neuron values in a hardware artificial neural network.

Discussion of Related Art

Artificial neural networks (ANNs) are distributed computing systems, which consist of several neurons interconnected through connection points called synapses. Each synapse encodes the strength of the connection between the output of one neuron and the input of another. The output of each neuron is determined by the aggregate input received from other neurons that are connected to it, and thus by the outputs of these "upstream" connected neurons and the strength of the connections as determined by the synaptic weights. The ANN is trained to solve a specific problem (e.g., pattern recognition) by adjusting the weights of the synapses such that a particular class of inputs produces a desired output. The weight adjustment procedure is known as "learning." There are many algorithms in the ANN literature for performing learning that are suitable for various tasks such as image recognition, speech recognition, language processing, etc. Ideally, these algorithms lead to a pattern of synaptic weights that, during the learning process, converges toward an optimal solution of the given problem.

An attractive implementation of ANNs uses some (e.g., CMOS) circuitry to represent the neuron, the function of which is to integrate or sum the aggregate input from upstream neurons to which a particular neuron is connected, and apply some nonlinear function of the input to derive the output of that neuron. Because in general, each neuron is connected to some large fraction of the other neurons, the number of synapses (connections) is much larger than the number of neurons; thus, it is advantageous to use some implementation of synapses that can achieve very high density on a neuromorphic computing chip. One attractive choice is a non-volatile memory (NVM) technology such as resistive random access memory (RRAM) or phase-change memory (PCM). Another attractive choice is a capacitor-transistor pair. It should be noted that while the following document will discuss NVM-based synapses, the techniques, methods, and embodiments are equally relevant to systems based on capacitance-based synaptic elements. Since both positive and negative (i.e., excitatory and inhibitory) weights are desired, one scheme uses a pair of NVM (or two capacitor-transistor pairs) to represent the weight as the difference in conductance between the two (see M. Suri et al., *IEDM Tech. Digest*, 4.4 (2011)). This scheme is shown in FIG. 1. FIG. 1 illustrates a layer of an ANN implemented on a crossbar array, with pairs of NVM conductances acting as synaptic weights. The outputs of the upstream $N_i$ neurons are summed in parallel through pairs of NVM conductances into the positive and negative inputs of the downstream $M_j$ neurons. This parallelism is highly advantageous for efficient computation. It should be noted that while a non-linear 2-terminal access device is shown in this scheme, 3-terminal transistor access devices are equally relevant to this discussion.

The accumulated currents can be mirrored and integrated onto an output capacitor, such that the final analog voltage is representative of the output value of one of the neurons. While this capacitor is 'local' to this particular array and is an analog representation of its output, this value of the output neuron activation must be made available, preferably in a digital format, at the input of another 'downstream' neural network layer implemented on a second crossbar array. This second array could be at an arbitrary distance away from the source/upstream first crossbar array, and preferably, the CMOS chip would be designed in such a way that the mapping between sets of array outputs and subsequent sets of next-array inputs may be chosen by the user at runtime rather than during fabrication.

FIG. 2 illustrates current mirrors that are used to replicate the instantaneous currents in the crossbar onto an output stage, such that these currents are integrated onto an output capacitance whose final voltage represents the analog activation of the neuron Mi.

A simplified approximate method to convert an analog voltage to a digital value involves discharging the stored charge at a constant current, and counting the number of clock pulses until the capacitor is fully discharged. While local digitization followed by transmittal to the downstream array would be possible and potentially accurate, this would require very careful synchronization of clock signals all across the system (with minimal clock skew), which could prove to be expensive and power-hungry, if not impossible. The process of passing N such digital values (where N may be 100-1000) would then require qN individual bus lines for parallel transmission, OR would require serialization for slower transmission across fewer bus lines. Such an approach would also require careful re-buffering of the digitized data signals to avoid issues related to interconnect-induced slew (i.e., the phenomenon by which rising and falling edges of input signals become less 'sharp' due to resistive and capacitive effects as they propagate along a metal wire) which carries an additional area penalty.

Thus, there is a need in the art for a technique, given one or more analog values encoded as voltages on a plurality of capacitances, to convey these values to a bank of digital buffers located across an arbitrary distance across the chip.

Embodiments of the present invention are an improvement over prior art systems and methods.

SUMMARY OF THE INVENTION

In one embodiment, the present invention provides a method for transmitting signals from one region on-chip to another region on-chip, without using a global clock or other means of global synchronization, wherein the method comprises transmitting a plurality of analog signals on a plurality of transmission channels, all of the transmission channels sharing a common initialization trigger, by encoding each of the signals in the delay between the common initialization trigger and a subsequent unique termination trigger, so that each of the signals is accurately digitized remotely, or to be used for direct integration remotely, using a limited number of transmission channels.

In another embodiment, the present invention provides a method implemented in an Artificial Neural Network (ANN), the ANN comprising a plurality of neurons arranged in layers, the layers comprising at least one upstream neuron layer and at least one downstream neuron layer, the output of the at least one upstream neuron layer connected to the input of the at least one downstream neuron layer, the method comprising: (a) commencing discharging of a capacitor in the upstream neuron layer based on an enable signal generated in the upstream neuron layer, the capacitor having an initial value representative of an output of the upstream neuron layer; (b) sharing the enable signal in (a) to an input of a digital counter located at the downstream neuron layer, where the counter, upon reception of the enable signal, starts counting using a clock that is local to the downstream neuron layer; (c) monitoring output analog voltage of the capacitor; and (d) when a voltage transition is detected in the monitored output analog voltage, (e) transmitting a voltage transition signal to the downstream neuron layer, wherein the downstream neuron layer latches a current value of the counter upon reception of the voltage transition signal, the latched current value being equal to the initial value representative of an output of the upstream neuron layer, and wherein the output value is communicated between the upstream neuron layer and the downstream neuron layer without global synchronization of clocks between the upstream neuron layer and the downstream neuron layer.

In a family of alternative embodiments, the capacitor associated with the upstream neuron is not in fact ramped down by discharging it, but instead its voltage is compared to a steadily increasing ramp, and the duration between the initial trigger of this ramp and the time at which the ramp voltage passes the capacitor voltage encodes the analog voltage for transmittal to the remote locale.

In another family of alternative embodiments, the duration arriving at the downstream neuron is not digitized, but instead immediately applied to the crossbar array of synaptic devices at that neuron, leading to integration onto a series of capacitors at the next layer of neurons even further downstream from this downstream neuron. Embodiments in which the incoming duration information is both digitized and is applied directly to the downstream synaptic array are also possible.

In yet another embodiment, the present invention provides a system implemented in an Artificial Neural Network (ANN), the ANN comprising a plurality of neurons arranged in layers, the system comprising: (a) a first circuit in a downstream neuron layer, the input of the downstream neuron layer connected to an output of the upstream neuron layer, the first circuit comprising a digital counter and a plurality of flip-flops; (b) a second circuit in an upstream neuron layer, the second circuit comprising: (i) a third circuit to generate an enable signal for discharging a capacitor, the capacitor having an initial value representative of an output of the upstream neuron layer; (ii) a fourth circuit to share the generated enable signal to an input of the digital counter, where the counter, upon reception of the enable signal, starts an upward count from zero using a clock that is local to the downstream neuron layer; (iii) a fifth circuit to monitor output analog voltage of the capacitor, and (iv) a sixth circuit to transmit a voltage transition signal to the plurality of flip-flops in the first circuit in the downstream neuron layer when a voltage transition is detected in the monitored output analog voltage, wherein the downstream neuron layer latches current value of the counter upon reception of the voltage transition signal, the latched current value being equal to the initial value representative of an output of the upstream neuron layer, wherein the output value is communicated between the upstream neuron layer and the downstream neuron layer without global synchronization of clocks between the upstream neuron layer and the downstream neuron layer.

In another embodiment, the present invention provides a method implemented in an Artificial Neural Network (ANN), the ANN comprising a plurality of neurons arranged in layers, the layers comprising at least one upstream neuron layer and at least one downstream neuron layer, the output of the at least one upstream neuron layer connected to the input of the at least one downstream neuron layer, the method comprising: (a) commencing ramping of a threshold voltage for comparison to an output analog voltage associated with a capacitor in the upstream neuron layer based on an enable signal generated in the upstream neuron layer, where an initial value of the voltage associated with the capacitor represents an output of the upstream neuron layer; (b) sharing the enable signal in (a) to an input of a digital counter located at the downstream neuron layer, where the counter, upon reception of the enable signal, starting counting using a clock that is local to the downstream neuron layer; (c) monitoring the ramped threshold voltage in (a) and detecting a transition at which the ramped threshold voltage passes the output analog voltage of the capacitor in the upstream neuron layer; and (d) when a voltage transition is detected in the monitored output analog voltage, (e) transmitting a voltage transition signal to the downstream neuron layer, wherein the downstream neuron layer latches a current value of the counter upon reception of the voltage transition signal, the latched current value being equal to the initial value representative of an output of the upstream neuron layer and wherein the output value is communicated between the upstream neuron layer and the downstream neuron layer without global synchronization of clocks between the upstream neuron layer and the downstream neuron layer.

BRIEF DESCRIPTION OF THE DRAWINGS

The present disclosure, in accordance with one or more various examples, is described in detail regarding the following figures. The drawings are provided for purposes of illustration only and merely depict examples of the disclosure. These drawings are provided to facilitate the reader's understanding of the disclosure and should not be considered limiting of the breadth, scope, or applicability of the disclosure. It should be noted that for clarity and ease of illustration these drawings are not necessarily made to scale.

DESCRIPTION OF THE PREFERRED EMBODIMENTS

Figure 1:
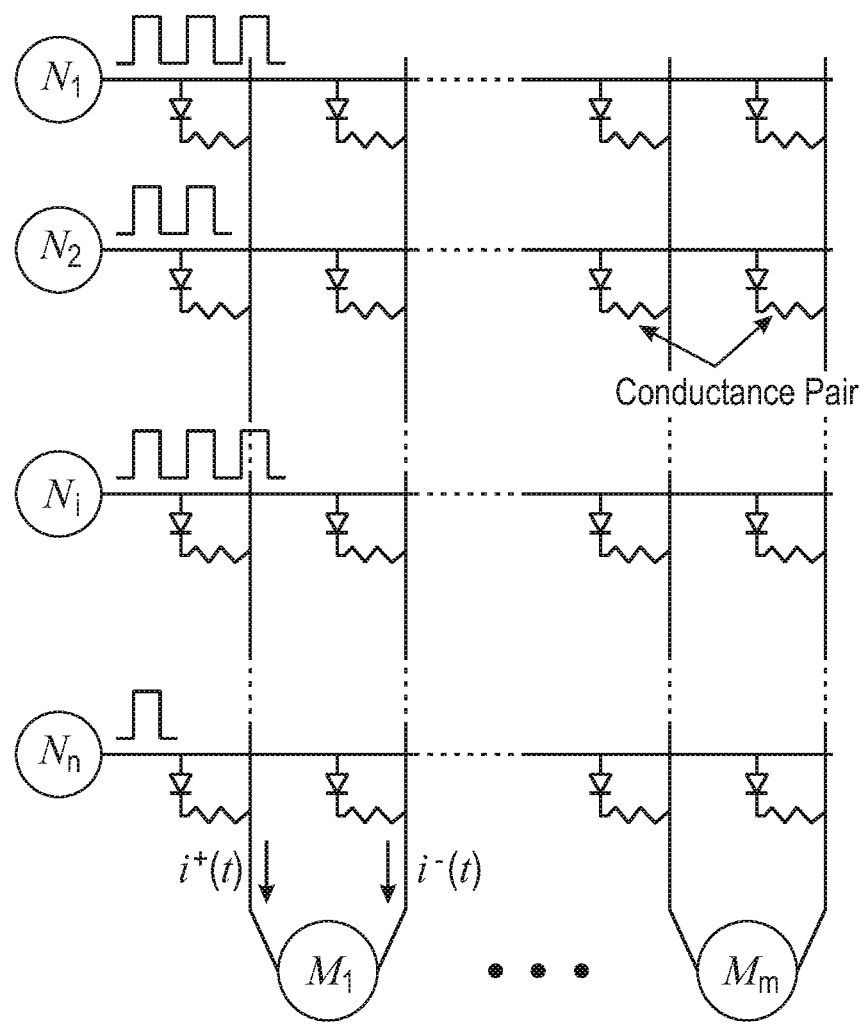
FIG. 1 illustrates a layer of an ANN implemented on a crossbar array, with pairs of NVM conductances acting as synaptic weights.
Figure 2:
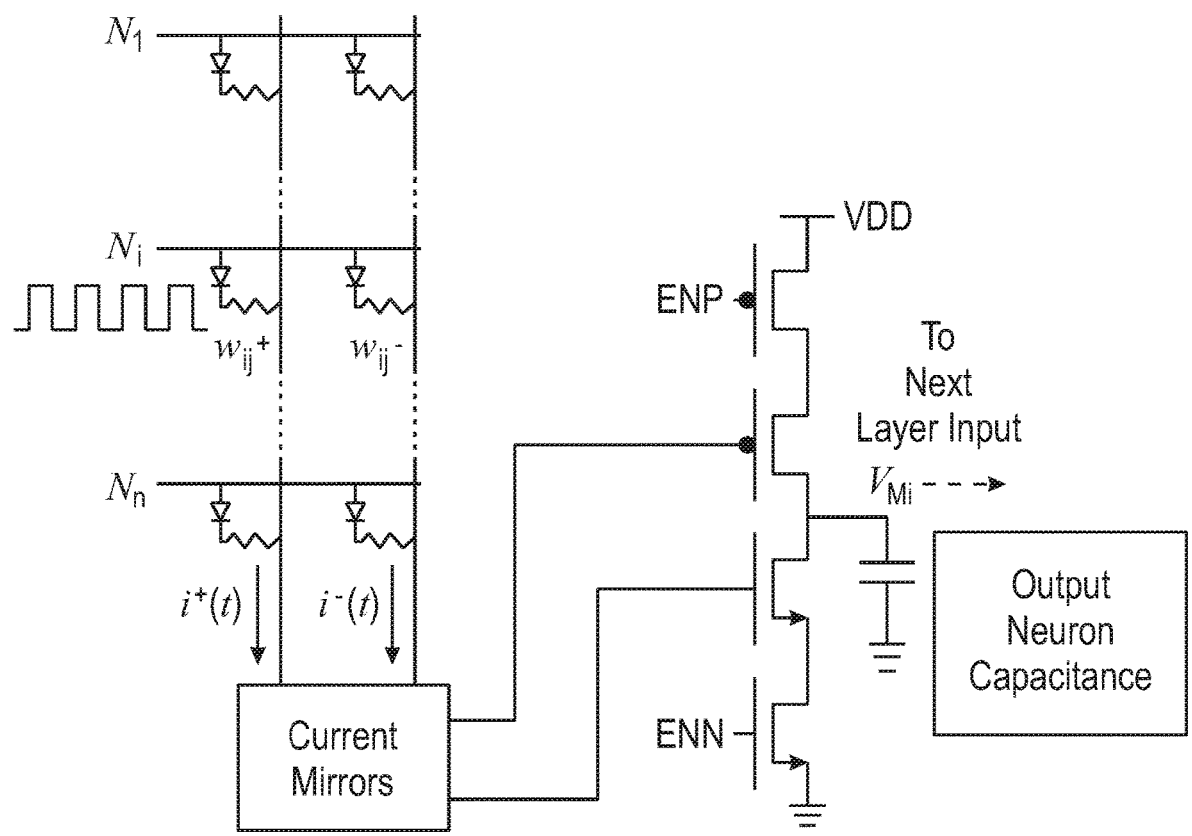
FIG. 2 illustrates current mirrors that are used to replicate the instantaneous currents in the crossbar onto an output stage, such that these currents are integrated onto an output capacitance whose final voltage represents the analog activation of the neuron Mi.

While this invention is illustrated and described in a preferred embodiment, the invention may be produced in many different configurations. There is depicted in the drawings, and will herein be described in detail, a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the present invention.

Note that in this description, references to "one embodiment" or "an embodiment" mean that the feature being referred to is included in at least one embodiment of the invention. Further, separate references to "one embodiment" in this description do not necessarily refer to the same embodiment; however, neither are such embodiments mutually exclusive, unless so stated and except as will be readily apparent to those of ordinary skill in the art. Thus, the present invention can include any variety of combinations and/or integrations of the embodiments described herein.

A preferred embodiment of the invention described here can eliminate challenges related to synchronization of clock signals and slew in data, by encoding data into analog delays and digitizing only at the destination/downstream crossbar array. A preferred embodiment of the invention introduces an initial trigger signal at the source/upstream crossbar array, which traverses the same distance as the subsequent data signals. Both trigger and data signals are thus subject to the same slew effects and the same delays, at least to first order. This approach is well-suited to contexts where the overall application is resilient to small, zero-mean errors in the transmitted data, such as an Artificial Neural Network.

In a preferred embodiment, once the integration operations of charge onto the capacitors in the upstream neurons has fully completed, an enable signal is generated by the control logic of the upstream crossbar array. This enable signal is used to commence discharge of the analog voltage stored on the capacitor in each output neuron, or alternatively, to commence a ramped voltage for use in comparing to these analog voltages. The enable signal is also transmitted to the input of a digital counter that is located at the downstream array. When received, the counter will start an upward count from zero using a clock which need only be synchronous in the local region of the downstream, destination array.

Figure 3:
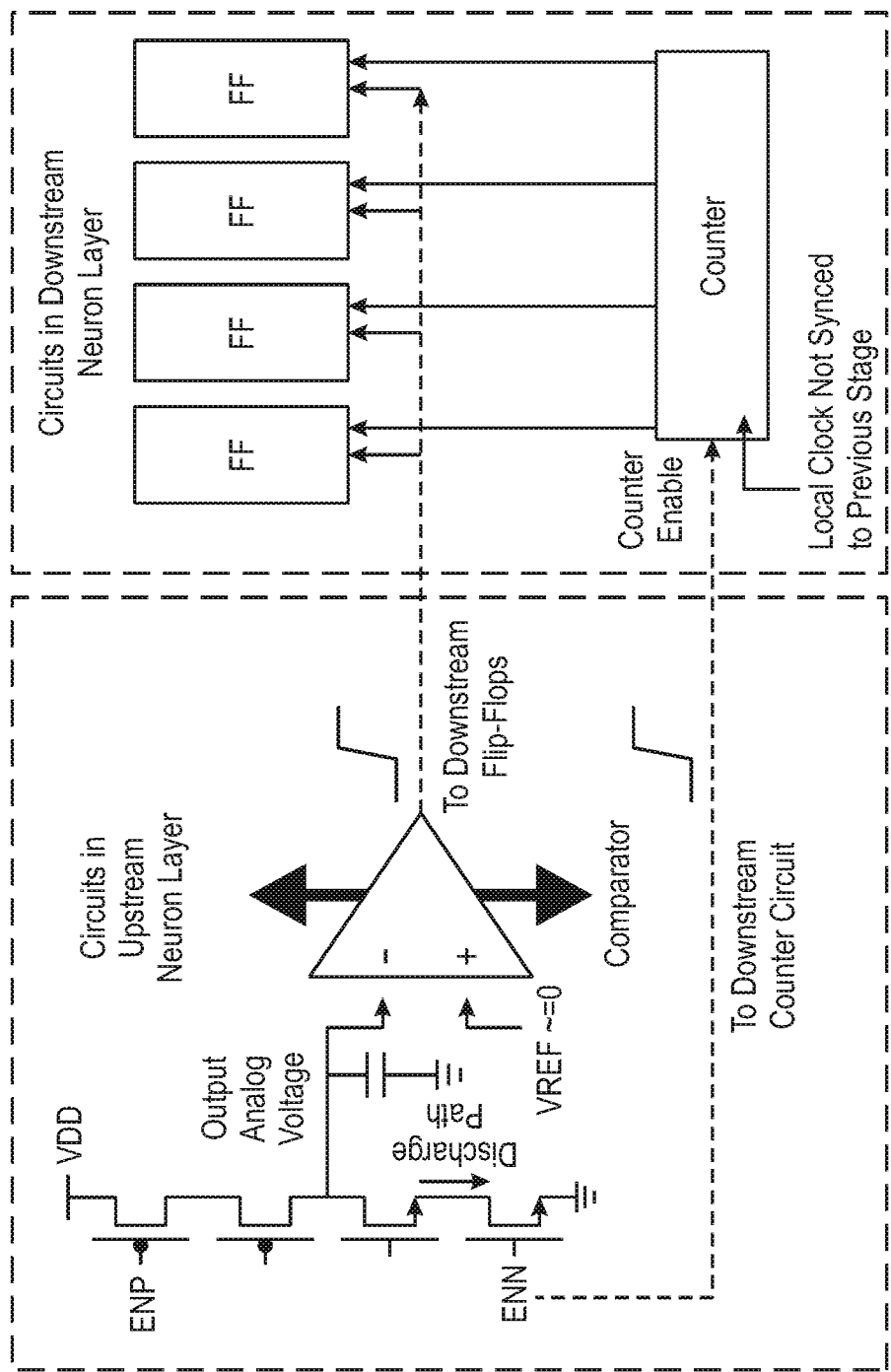
FIG. 3 illustrates how an enable signal which starts the analog discharge is shared with a counter associated with the downstream neuron layer.

FIG. 3 illustrates how the enable signal, which starts the analog discharge, is shared with the counter in the output stage. When the comparator rising edge arrives at the FFs, the instantaneous value of the counter is captured. This value is a digital representation of the analog voltage on the upstream output capacitor and is stored locally in the downstream array, since both the arriving signals are subject to the same delays.

At some point in time, the capacitor voltage will drop below a reference voltage close to zero, or the stationary undischarged capacitor voltage will be passed by the reference voltage ramp. This will cause the output of a comparator, attached to both the output capacitance node and the reference voltage to undergo a '0' to '1' transition. This rising edge will be transmitted to the downstream array, where a bank of flip-flops receiving inputs in parallel from the outputs of the local counter can latch in the current values of the counter bits when this rising edge is received. While there is a non-negligible propagation delay from the output of the comparator (which is local to the upstream array) and the receiving flip-flops (which are local to the downstream array), this delay is comparable to, and is thus effectively offset by, the delay in the enable signal that commenced the counter operation. Thus, without needing to globally synchronize clocks across the chip, it is possible to effectively transmit information.

The idea can be extended to a single shared counter at the downstream array, with multiple rising edges from different comparators latching in the instantaneous counter value to different flip-flops at various instances in time. As before, so long as the distances are comparable, the latched in value is expected to be a reasonable approximate estimation of the 'true' analog voltage.

Potentially, both the trigger/enable signal and the comparator signal can be conveyed on a multi-wire bus, such that the data pattern on this bus encodes the address of the capacitor from which the signal originated, and thus the address of the particular flip-flop which should be latched at the instant of arrival of this data pattern. The delays associated with encoding this address at the source array, and of decoding this address at the destination, need only be identical for each and every capacitor/flip-flop pair, and can be added into the delay associated with the arrival of the trigger signal. If this is done correctly, the first delay at the source between triggering capacitive readout and the transition of the comparator, and the second delay at the destination between triggering of the counter and the latching of the associated flip-flop, will differ by a constant value, which can be engineered to be zero or non-zero as desired. However, this approach could potentially cause some data values to be conveyed incorrectly due to contention (too many comparators tripping within the same short time window). Some tolerance to contention could be designed in by transmitting both a physical address and an encoded delay (after physical address decoding) to be imposed before latching. Thus, several simultaneous comparator events would be transmitted using the appropriate physical addresses and several different encoded delays such that the latching events at the destination occurred nearly simultaneously and at the desired delay (e.g., counter value).

Figure 4:
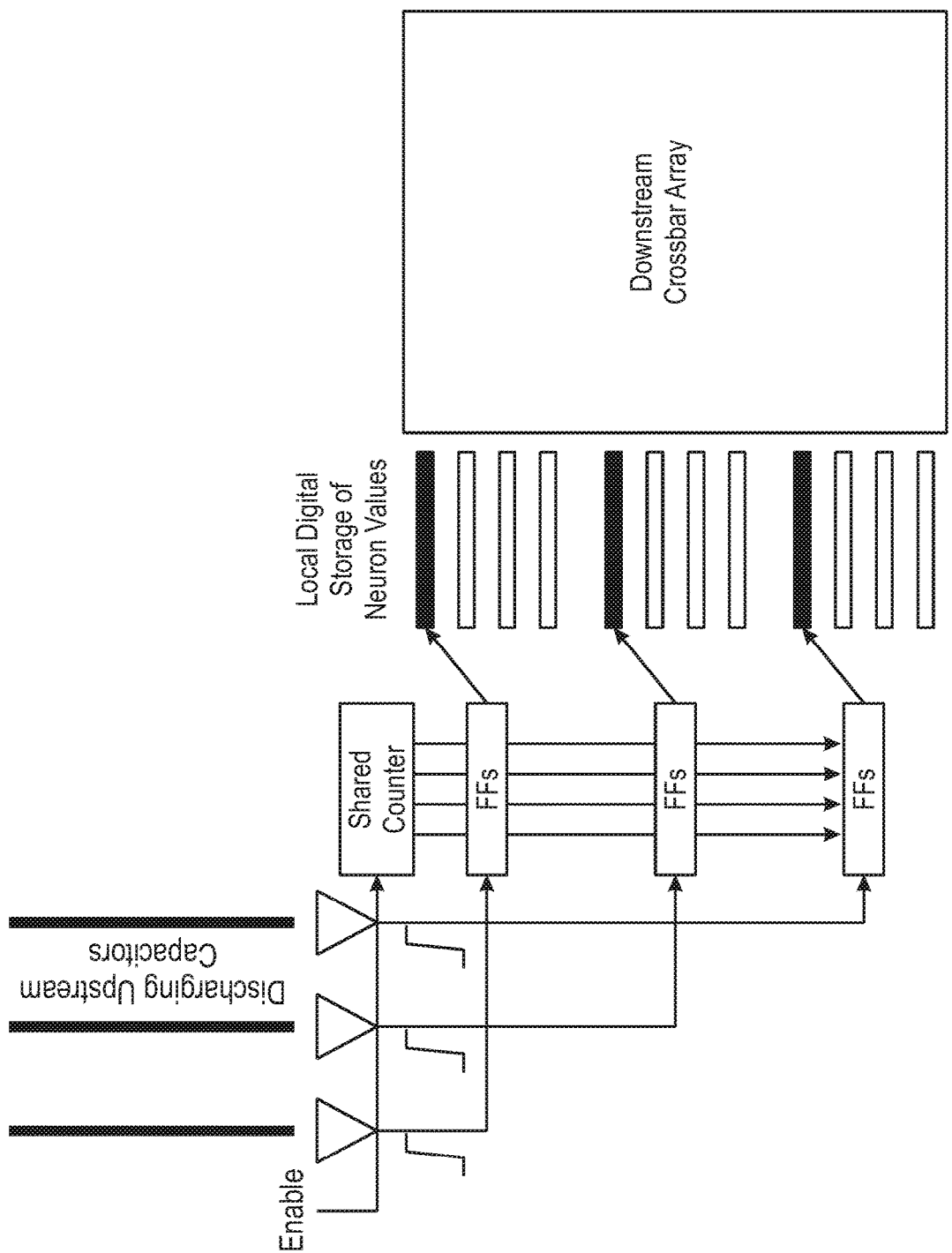
FIG. 4 illustrates a sample circuit where a single counter at the downstream crossbar array can be shared by multiple digitizing flip-flops.

FIG. 4 illustrates a sample circuit where a single counter at the downstream crossbar array can be shared by multiple digitizing flip-flops. Each arriving rising edge will independently capture different instantaneous values of this counter, depending on the exact arrival time.

In another embodiment, the present invention provides a method implemented in an Artificial Neural Network (ANN), the ANN comprising a plurality of neurons arranged in layers, the layers comprising at least one upstream neuron layer and at least one downstream neuron layer, the output of the at least one upstream neuron layer connected to the input of the at least one downstream neuron layer, the method comprising: (a) commencing discharging of a capacitor in the upstream neuron layer based on an enable signal generated in the upstream neuron layer, the capacitor having an initial value representative of an output of the upstream neuron layer; (b) sharing the enable signal in (a) to an input of a digital counter located at the downstream neuron layer, where the counter, upon reception of the enable signal, starting an upward count from zero using a clock that is local to the downstream neuron layer; (c)

monitoring output analog voltage of the capacitor and, when a voltage transition is detected in the monitored output analog voltage, (d) transmitting a voltage transition signal to the downstream neuron layer, and wherein the downstream neuron layer latches current value of the counter upon reception of the voltage transition signal, the latched current value equal to the initial value representative of an output of the upstream neuron layer and where the output value is communicated between the upstream neuron layer and the downstream neuron layer without global synchronization of clocks between the upstream neuron layer and the downstream neuron layer.

In a family of alternative embodiments, the capacitor associated with the upstream neuron is not in fact ramped down by discharging it, but instead its voltage is compared to a steadily increasing ramp, and the duration between the initial trigger of this ramp and the time at which the ramp voltage passes the capacitor voltage encodes the analog voltage for transmittal to the remote locale.

In another family of alternative embodiments, the duration arriving at the downstream neuron is not digitized, but instead immediately applied to the crossbar array of synaptic devices at that neuron, leading to integration onto a series of capacitors at the next layer of neurons even further downstream from this downstream neuron. Embodiments in which the incoming duration information is both digitized and is applied directly to the downstream synaptic array are also possible.

In yet another embodiment, the present invention provides a system implemented in an Artificial Neural Network (ANN), the ANN comprising a plurality of neurons arranged in layers, the system comprising: (a) a first circuit in a downstream neuron layer, the input of the downstream neuron layer connected to an output of the upstream neuron layer, the first circuit comprising a digital counter and a plurality of flip-flops; (b) a second circuit in an upstream neuron layer, the second circuit comprising: (i) a third circuit to generate an enable signal for discharging a capacitor, the capacitor having an initial value representative of an output of the upstream neuron layer; (ii) a fourth circuit to share the generated enable signal to an input of the digital counter, where the counter, upon reception of the enable signal, starts an upward count from zero using a clock that is local to the downstream neuron layer; (iii) a fifth circuit to monitor output analog voltage of the capacitor and, when a voltage transition is detected in the monitored output analog voltage, (iv) a sixth circuit to transmit a voltage transition signal to the plurality of flip-flops in the first circuit in the downstream neuron layer, wherein the downstream neuron layer latches current value of the counter upon reception of the voltage transition signal, the latched current value equal to the initial value representative of an output of the upstream neuron layer, and wherein the output value is communicated between the upstream neuron layer and the downstream neuron layer without global synchronization of clocks between the upstream neuron layer and the downstream neuron layer.

In another embodiment, the present invention provides a method implemented in an Artificial Neural Network (ANN), the ANN comprising a plurality of neurons arranged in layers, the layers comprising at least one upstream neuron layer and at least one downstream neuron layer, the output of the at least one upstream neuron layer connected to the input of the at least one downstream neuron layer, the method comprising: (a) commencing ramping of a threshold voltage for comparison to an output analog voltage associated with a capacitor in the upstream neuron layer based on an enable signal generated in the upstream neuron layer, where an initial value of the voltage associated with the capacitor represents an output of the upstream neuron layer; (b) sharing the enable signal in (a) to an input of a digital counter located at the downstream neuron layer, where the counter, upon reception of the enable signal, starting counting using a clock that is local to the downstream neuron layer; (c) monitoring the ramped threshold voltage in (a) and detecting a transition at which the ramped threshold voltage passes the output analog voltage of the capacitor in the upstream neuron layer; (d) transmitting a voltage transition signal to the downstream neuron layer, and wherein the downstream neuron layer latches current value of the counter upon reception of the voltage transition signal, the latched current value equal to the initial value representative of an output of the upstream neuron layer and where the output value is communicated between the upstream neuron layer and the downstream neuron layer without global synchronization of clocks between the upstream neuron layer and the downstream neuron layer.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous.

The various embodiments described above are provided by way of illustration only and should not be construed to limit the scope of the disclosure. Those skilled in the art will readily recognize various modifications and changes that may be made to the principles described herein without following the example embodiments and applications illustrated and described herein, and without departing from the spirit and scope of the disclosure.

CONCLUSION

A system and method has been shown in the above embodiments for the effective implementation of a system, method and an article of manufacture for synchronization-free transmittal of neuron values in a hardware artificial neural network. While various preferred embodiments have been shown and described, it will be understood that there is no intent to limit the invention by such disclosure, but rather, it is intended to cover all modifications falling within the spirit and scope of the invention, as defined in the appended claims. For example, the present invention should not be limited by software/program, computing environment, or specific computing hardware.

The invention claimed is:
1. A method for transmitting signals from one region on-chip to another region on-chip, without using a global clock or other means of global synchronization, the method comprising:
 transmitting a plurality of analog signals on a plurality of transmission channels, all of the transmission channels sharing a common initialization trigger, by encoding each of the signals in the delay between the common initialization trigger and a subsequent unique termination trigger, so that each of the signals is accurately digitized remotely using a limited number of transmission channels.

2. The method of claim 1, in which an addressing scheme allows arriving signals on a multi-bit data bus to determine the particular destination circuit node to which the data must be directed.

3. The method of claim 1, in which an additional level of encoding avoids conflicts caused by nearly simultaneous arrival of two or more signals, where both the arriving address and an associated additional delay determine the particular destination circuit node to which the data must be directed.

4. The method of claim 1, wherein the plurality of analog signals is used in an analog manner at said another region without conversion of the analog signals to a digitized form.

* * * * *